United States Patent [19]

Drexler

[11] Patent Number: 4,665,004
[45] Date of Patent: * May 12, 1987

[54] METHOD FOR DUAL IMAGE RECORDING OF MEDICAL DATA

[75] Inventor: Jerome Drexler, Los Altos Hills, Calif.

[73] Assignee: Drexler Technology Corporation, Mountain View, Calif.

[*] Notice: The portion of the term of this patent subsequent to Mar. 5, 2002 has been disclaimed.

[21] Appl. No.: 692,788

[22] Filed: Jan. 17, 1985

Related U.S. Application Data

[63] Continuation-in-part of Ser. No. 679,204, Dec. 6, 1984, Pat. No. 4,572,891, which is a continuation-in-part of Ser. No. 443,596, Nov. 22, 1982, Pat. No. 4,503,135, which is a continuation-in-part of Ser. No. 238,832, Feb. 27, 1981, Pat. No. 4,360,728, and Ser. No. 238,833, Feb. 27, 1981, abandoned.

[51] Int. Cl.[4] .......................... G03C 5/14; G03C 3/00
[52] U.S. Cl. ...................................... 430/140; 430/12; 430/15; 430/346; 430/945; 430/966; 430/967; 250/475.2; 354/110; 365/215; 369/275; 346/76 L; 346/135.1
[58] Field of Search ................... 430/12, 15, 140, 346, 430/966, 967, 495, 945; 346/76 L, 135.1; 369/265, 273, 275; 365/215; 354/110; 250/475.2

[56] References Cited

U.S. PATENT DOCUMENTS

| 2,630,534 | 3/1953 | Heinecke et al. ............... 430/967 X |
| 3,932,032 | 1/1976 | Weinstein ............................. 352/11 |
| 4,014,604 | 3/1977 | Schwartz ............................ 353/120 |
| 4,319,252 | 3/1982 | Drexler ........................... 346/135.1 |
| 4,366,217 | 12/1982 | Bird et al. ............................ 430/11 |
| 4,394,661 | 7/1983 | Peeters ................................ 346/1.1 |
| 4,503,135 | 3/1985 | Drexler ................................ 430/12 |

FOREIGN PATENT DOCUMENTS 2036369A 12/1978 United Kingdom .
2044175A 10/1980 United Kingdom .

OTHER PUBLICATIONS

Meyers et al, "Evaluation of Computer–Retrieved Radiographic Image", Radiology, vol. 81, No. 2, Aug. 1963, pp. 201–206.

Primary Examiner—John E. Kittle
Assistant Examiner—José G. Dees

[57] ABSTRACT

A laser beam records a digital representation of a medical picture and medical information on an optical data storage strip. The strip is adhered to a medium containing an eye readable picture generated from the same data, such as X-ray pictures, CAT-scan pictures, ultrasonic or NMR images. The medical information may be the image itself, a description or diagnosis related to the picture.

20 Claims, 8 Drawing Figures

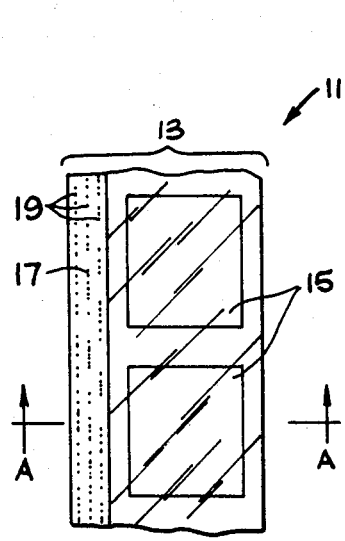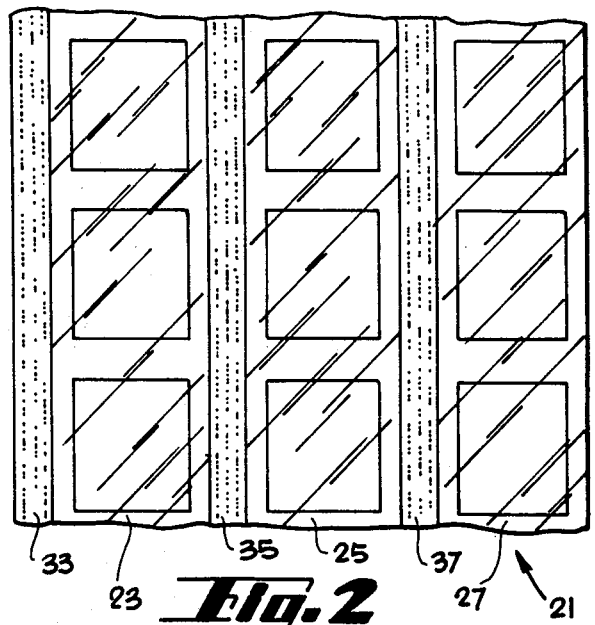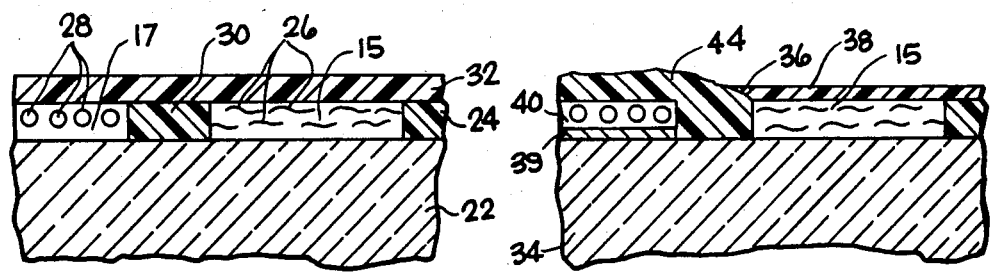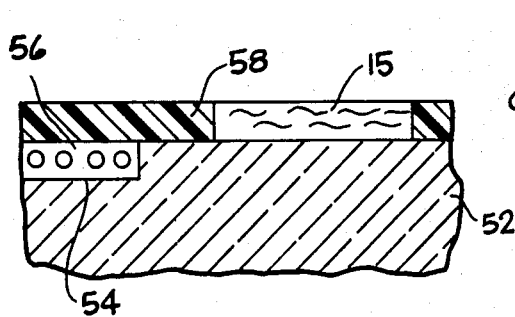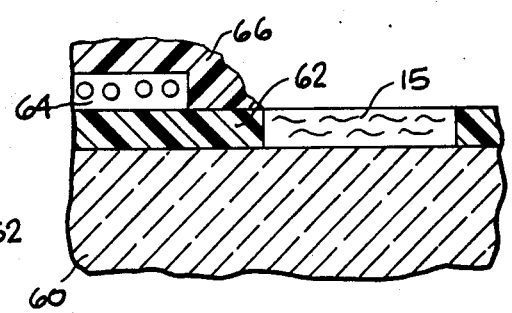

METHOD FOR DUAL IMAGE RECORDING OF MEDICAL DATA

DESCRIPTION

Cross Reference to Related Applications

This is a continuation-in-part of patent application Ser. No. 679,204 filed Dec. 6, 1984, Pat. No. 4,572,891 which is a continuation-in-part of patent application Ser. No. 443,596 filed Nov. 22, 1982, Pat. No. 4,503,135 which is a continuation-in-part of patent application Ser. No. 238,832 filed Feb. 27, 1981, now U.S. Pat. No. 4,360,728, granted Nov. 23, 1982 and patent application Ser. No. 238,833 filed Feb. 27, 1981, now abanonded.

TECHNICAL FIELD

The invention relates to optical data information storage and in particular to storage of digital signals from medical diagnostic scanners, tomography machines and the like.

BACKGROUND ART

In medical records archival data storage, it is frequently necessary to store pictures such as digital X-ray pictures, CAT-scan pictures, digital microscope photographs, NMR and ultrasonic scan pictures, and other diagnostic images. These pictures originate as digital data. If digital data is not recorded in anticipation of future image processing, it would be lost forever. Frequently the data is converted to an enhanced eye readable picture representing only one form of the data.

In U.S. Pat. No. 4,236,332, Domo discloses a wallet-size medical record card to be carried by the individual containing a microfilm portion having some data visible to the eye and other data visible by magnification. The directly visible data is code characters pertaining to emergency medical conditions of the patient and magnifiable data portions detail the medical history. Such cards are not intended for achival storage and cannot be used for that purpose. Cards cannot contain X-ray pictures, CAT-scan pictures and the like without loss of vital image resolution.

In U.S. Pat. No. 4,110,020, Johnson et al. add bar codes along the edge of microfilm having image areas. These codes are used by the film reader to locate the desired frame. Bar codes are rather limited in the type and amount of information they can represent, so their use with detailed medical information is undesirable.

An object of the invention is to provide recording of digital image signals from a medical scanner, such as a CAT-scanner, NMR scanner, ultrasonic scanner, or digital X-ray scanner in a useful format.

DISCLOSURE OF THE INVENTION

The above objects have been met by recording a digital representation of a medical picture and related medical information on a strip of laser recordable material which is disposed next to an eye readable medical image on a picture storage medium, such as film. Many new imaging devices such as tomography machines and scanners provide digital outputs. By recording a digital representation of a picture the raw data is saved. Pictures produced from the data usually have enhancements which require subduing unwanted signal components. In the present invention a digital representation is combined with an eye readable picture so that the picture can be reconstructed with other enhancements if desired. The storage medium could be either unexposed or exposed in plates, strips, or roll configuration. The film records visual images of a body, such as X-ray pictures, CAT-scan pictures, NMR- and ultrasonic-scan pictures, microscope photographs, and other diagnostic images. The data strip could be recorded in-situ on blank optical media o pre-recorded and added to the film.

The digital image representation of the medical scanners is recorded directly on the data strip in digital form. Analytical or interpretive data, such as a diagnosis, or an anatomical description, may be integrated with the digital picture record and both stored together. A laser beam records data on the strip of laser recordable material either by ablation, melting, physical or chemical change, or by deformation thereby forming spots representing changes in reflectivity. Differences in reflectivity or transmissivity are detectable by a light detector. In this manner, data concerning the visual image may be digitally recorded and read directly from the strip. The digital version of the image can be analyzed by computer techniques such as enhancement, or can be used for making accurate photographic copies of the original image. The strip may contain prerecorded data, concurrently recorded data or data recorded after exposure of the photosensitive film portion of the media. The strip may be reflective or transmissive type optical media.

No processing after laser recording is required for the recording strip when it is a direct-read-after-write material. The uniform surface reflectivity of this reflective strip before recording typically would range between 8% and 65%. For a highly reflective strip, the average reflectivity over a laser recorded spot might be in the range of 5% to 25%. Thus, the reflective contrast ratio of the recorded spots might range between 2:1 and 7:1. When the reflectivity of the field is in the range of 8% to 20% then the reflective spots might have a reflectivity of 40%. The reflective contrast ratio thus might range between 2:1 and 5:1. Photographic preformatting would create spots having a 10% reflectivity in a high reflective field or 40% in a low reflective field.

The laser scanning system records and reads using a mirror directed laser beam and a photodetector. A photodetector array such as a CCD could also be used. A laser light source, such as a semiconductor laser, emits a beam which is directed to a first servo-controlled mirror. The mirror is mounted for rotation along an axis such that the beam may be moved laterally on the strip. The strip has data tracks running in the lengthwise direction of the strip. The lateral motion of the beam thus allows different tracks to be recorded and read. From the first mirror, the beam is directed toward a second servo-controlled mirror. This second mirror is mounted for rotation along an axis such that the beam may be moved lengthwise along the strip. In this way the beam moves along a track. Upon reading or writing one track, the first mirror moves an incrimental amount so that the next track may be scanned. It is also possible to align the tracks in a crosswise direction so that it is in the lateral direction of the strip. Differences in reflectivity between a data spot are detected by a light detector, such as a photodiode, which produces electrical signals corresponding to the spots. Prerecorded reference position information may be present on the strip to aid servo control. The eye readable version of the image may be printed by a commercial machine.

An advantage of the invention is that laser recorded data, particularly digital image data, will be saved and will not be separated from corresponding image data. Both will have similar archival properties. The strip may be placed directly on the photographic film or on the film substrate.

BRIEF DESCRIPTION OF THE DRAWINGS

FIG. 1 is a top view of a first embodiment of the recording medium of the present invention.

FIG. 2 is a top view of the second embodiment of the present invention.

FIGS. 3–6 are alternate sectional constructions of the medium of FIG. 1 taken along lines A—A in FIG. 1.

BEST MODE FOR CARRYING OUT THE INVENTION

Figure 7:
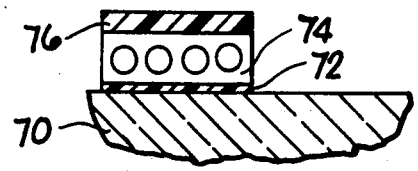
FIG. 7 is a partial sectional view of an alternate embodiment of the medium of FIG. 1.

With reference to FIG. 1, the data medium used in the present invention may be seen to compromise a photographic medium 11 having a planar major surface 13 which is divided into a photographic image areas 15 and a data strip 17. Photographic medium 11 is preferably film in sheet form, for example X-ray film, plate film, microfiche film or high resolution photoplates of the type used in the semiconductor industry. The photographic image areas 15 are conventional photographic images produced by usual photographic techniques, typically by exposure and development of the medium. The image areas 15 may occupy the entirety of the photographic medium, except for the data strip, or discrete areas as shown in FIG. 1. The discrete areas may resemble motion picture film or roll film or microfiche film where several images may be disposed on the photographic medium. Alternatively, only a single image may be on the medium.

The present invention features an optical data strip 17 which may be a direct read-after-write (DRAW) material which may have either prerecorded information or user-written information, or both. The type of DRAW material that may be used is relatively high reflective material which forms a shiny field against low reflectivity spots such as pits, craters, holes or dark spots in the reflective surface which tend to be absorbtive of light energy. The contrast differences between the low reflectivity spots and the shiny reflective field surrounding the spots cause variations at a detector when the spots are illuminated by light of lesser intensity than the light that originally created the spots. These are also laser recording materials which create reflective spots in a dark field.

Data strip 17 is intended to provide an archival data record accompanying the photographic images on the same material just as a movie sound track accompanies a sequence of frames of film. Data is written in individual tracks extending in a longitudinal direction, as indicated by the spot patterns 19 and these spot patterns are analogous to sound track on a film, except that the data tracks contain a much higher density of information and are usually read in reflection, rather than in transmission. The information density is greater because each of the spots in the spot pattern is approximately 5 microns in diameter with a spacing of about 5–20 microns between spots. A one inch (25 mm) piece of 16 mm wide data strip holds three million bits of information, which is adequate for one digitized image. The spots may be either digital or analog data, but in either case are recorded by a laser in the usual way, for example as shown in U.S. Pat. No. 4,278,756 to Bouldin, et al.

FIG. 2 is similar to FIG. 1 except that a larger photographic medium 21 is used with a plurality of rows of images 23, 25, and 27. Accompanying each row of images is a corresponding data strip 33, 35 and 37. These data strips are analogous in construction to the strip of FIG. 1. Once again, it is not necessary that each row have individually different images. Each row may consist of either multiple images or a single image. The embodiment of FIG. 2 is a microfiche type medium where each row of images would have corresponding data on a data strip. The images are such that they can be viewed with the naked eye or with low power (magnification) optical systems. On the other hand, the data strips are not usually read with the naked eye, but require either microscope inspection or preferably reading by reflection of a scanning laser beam as explained below.

FIG. 3 illustrates a first construction of the recording medium shown in FIG. 1. The sectional view includes a substrate 22 which is transparent and may be glass or one of the many polymeric substrate materials known in photographic arts. Applied to the substrate 22 is a subbing layer, not shown, and an emulsion layer 24. This emulsion layer has a photographic image area 15 made by exposure and development in the usual way. The wavy lines 26 represent filamentary black silver particles which characterize normal photographic black and clear images. Data strip 17 is one of many laser recording materials. It may, for example, be made from silver-halide emulsion having fine grain size, less than 0.1 microns, by a silver diffusion transfer process described in U.S. Pat. No. 4,312,938 (Drexler and Bouldin), incorporated by reference herein.

In the referenced patented process, silver-halide emulsion is exposed to a non-saturating level of actinic radiation to activate silver halide. The activated emulsion is then photographically developed to a gray color of an optical density of 0.05–2.0 to red light, forming an absorptive underlayer. There is no fixing after this first development step. The surface of the emulsion strip is then fogged by a fogging agent such as borohydride to produce silver precipitating nuclei from the part of the unexposed and undeveloped silver-halide emulsion. The strip is then contacted with a monobath containing a silver-halide solvent and a silver reducing agent to complex, transfer and reduce the remaining unexposed and undeveloped silver to reflective non-filamentary silver at the nuclei sites on the surface. The reflective layer contains from 20% to 50% silver particles of which 1% to 50% may be filamentary silver formed in the initial development step. Beneath the reflective layer is an absorptive underlayer.

The reflective surface layer is characterized by non-filamentary particles 28 overlying a concentration of filamentary particles which form the absorptive underlayer. Separating the data strip from the image area is an unprocessed silver-halide buffer area 30 which would remain generally clear since it is neither exposed nor developed. The buffer area 30 is not necessary, but is desirable because chemical processing of data strip 17 differs from the processing of image area 15. The buffer area 30 may be fixed to remove silver halide so that the area will remain clear. This is optional. Both processes may occur by spraying of chemicals onto the surface of the film, with a mask covering buffer area 30. Such spray processing is well known in the photolithography. However, in the present case it may be necessary to proceed in two steps. In the first step, conventional photographic processing of image area 26 takes place. Subsequently, the image area, together with the buffer area 30 is masked to allow seperate processing of the data strip 28. After processing is complete, a transparent layer 32 is applied to the emulsion, forming a protective layer. Layer 32 may be any of the well known protective coatings, including a layer of clear gelatin. The remainder of the film, apart from the data strip 17, need not have fine grain size. Data strip 17 can also be added to the photographic material in the form of an adhesive tape which is bonded to the photographic material either before or after the film is developed.

FIG. 4 is similar to FIG. 3 except that substrate 34 is coated only with silver-halide emulsion to the right of line 36. The image area 15 is exposed, developed and fixed. A protective coating 38 may then be applied. A preformed strip 40 of laser recording material may then be disposed on the substrate. This may be a strip of Drexon material. Drexon is a trademark of Drexler Technology Corporation for reflective silver based laser recording material, such as that described in the aforementioned U.S. Pat. No. 4,312,938. Such a preformed strip of laser recording material would have its own thin substrate 39 carrying the emulsion layer. Alternatively, the recording material could be any of the other direct-read-after-write laser recording materials, for example such as that described in U.S. Pat. No. 4,230,939 issued to De Bont, et al. where the patent teaches a thin metallic recording layer of reflective metal such as Bi, Te, Ind, Sn, Cu, Al, Pt, Au, Rh, As, Sb, Ge, Se, Ga. Materials which are preferred are those having high reflectivity and low melting point particularly Cd, Sn, Tl, Ind, Bi, and amalgams. These materials may be deposited directly on substrate 34, as by sputtering, or may be premanufactured on a very thin substrate and adhered to the substrate by means of a subbing layer. After adhering the DRAW material to the substrate, a transparent protective coating 44 is applied. This coating material may be the same as protective material 38.

With reference to FIG. 5, substrate 52 has a notch or groove 54 which allows placement of a DRAW material 56 therin. This laser recording material may be processed in situ from silver-halide material previously existing in the groove, as in the case of FIG. 3, or preexisting laser recording material which is placed in the groove, as with the the preexisting laser recording material of FIG. 4. In either case, the photographic image area 15 is exposed and developed in the usual way, while an unexposed and undeveloped area 58 protects data strip 56. Since emulsion area 58 is unexposed and undeveloped, it remains clear and forms a protective layer over the data strip.

In the embodiment of FIG. 6, no groove exists in substrate 60. Rather, a photographic image area 15 is exposed and developed in the usual way, with the remainder of the substrate being covered with emulsion which is masked and protected from exposure and development, forming a protected region 62. On top of the protected region 62 a strip of laser recording material 64 is positioned. This laser recording material may be formed in situ by application of a silver-halide emulsion strip which is then processed, as data strip 17 in FIG. 3 is processed, or may be a preformed strip which is applied as in FIG. 4. The strip is then covered with a protective coating 66.

With reference to FIG. 7, a substrate 70 is shown which carries a photographic image in a substrate portion not shown. This image may be above the substrate surface or within a groove of the substrate, as previously mentioned. The substrate carries a secondary substrate 72 which is a thin flexible material, only a few mils thick carrying a laser recording material 74. The secondary substrate 72 is adhered to the primary substrate 70 by means of an adhesive or sticky substance, similar to dry adhesives found on tape. The laser recording material may be any of the materials previously discussed, such as DREXON material, except that the secondary substrate 72 is substituted for the substrate previously mentioned. A protective coating 76 is applied over the laser recording material. Using this embodiment, photographs of the prior art may be converted to the optical data and image medium of the present invention. In this situation, not shown in the drawing of FIG. 7, a portion of an image area is converted to a non-image area by application of the sticky laser recording material. The laser recording material rests above developed silver-halide emulsion, resembling FIG. 6, except that the emulsion is completely exposed and developed in the region underlying the secondary substrate.

In all of these embodiments, a strip of laser recording material is positioned adjacent one or more photographic images for providing archival data storage of a similar quality as for the photo image. Digital image data, and remarks in the form of alphanumerics or voice may be recorded adjacent to the photographic image. By this means these two forms of communication will not be separated. This arrangement is of particular value to add analytical information to X-rays used for medical purposes, or for non-destructive testing or to add to photomicrographics of biological objects or metallurgical structures.

Figure 8:
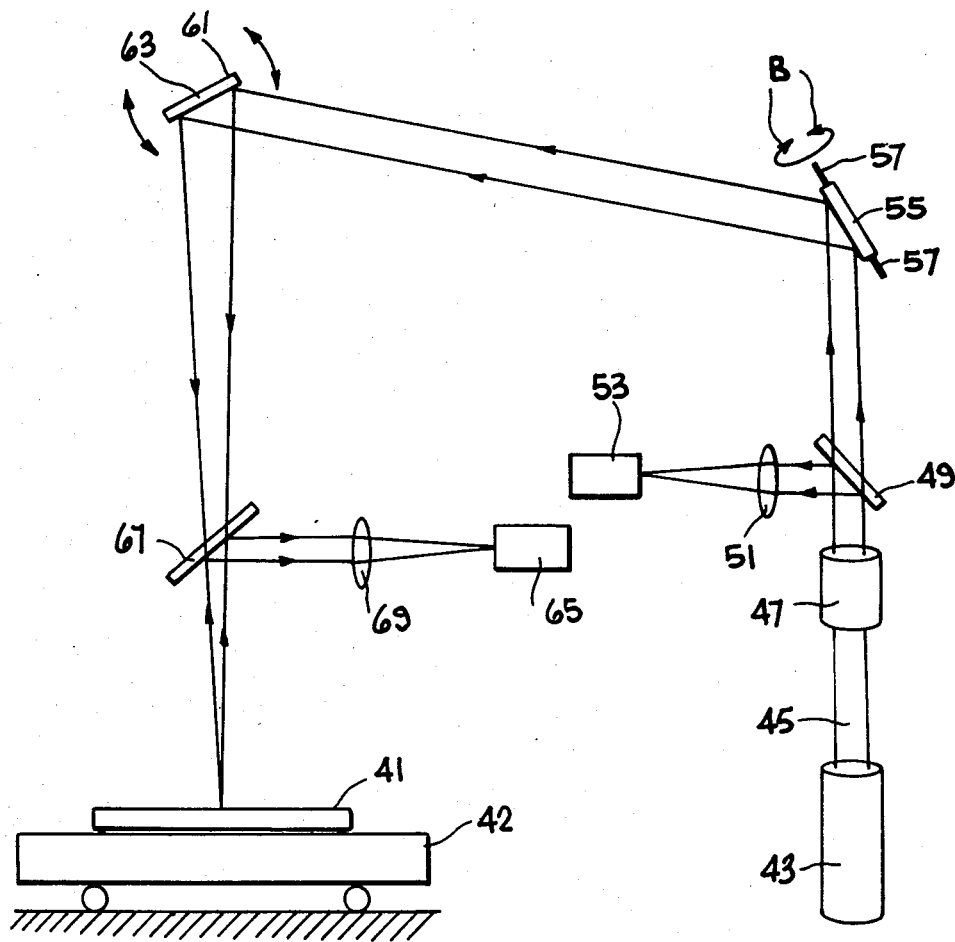
FIG. 8 is a plan view of optical apparatus for reading and writing on the data strip portion of the medium illustrated in FIG. 1.

Of course, while the photo images may be read by conventional means, low-powered laser or a photodetector array apparatus must be used to read the data strip. A laser apparatus is illustrated in FIG. 8, which illustrates the side view of the lengthwise dimension of the medium of FIG. 1 consisting of a data strip in combination with photo images. The data strip portion 41 of the medium is usually received in a movable holder 42 which brings the strip into the trajectory of a laser beam. A laser light source 43, preferably a pulsed semiconductor laser of infared wavelength emits a beam 45 which passes through collimating and focusing optics 47. The beam is sampled by a beam splitter 49 which transmits a portion of the beam through a focusing lens 51 to a photodetector 53. The detector 53 confirms laser writing and is not essential. The beam is then directed to a first servo controlled mirror 55 which is mounted for rotation along axis 57 in the direction indicated by arrows B. The purpose of the mirror 55 is to find the lateral edges of the data strip in a coarse mode of operation and then in a fine mode of operation identify data paths which exist predetermined distances from the edges.

From mirror 55, the beam is directed toward a mirror 61. This mirror is mounted for rotation at pivot 63. The purpose of mirror 55 is for fine control of motion of the beam along the length of the data strip. Coarse control of the lengthwise portion of the data strip relative to the beam is acheived by motion of the movable holder 42. The position of the holder may be established by a linear motor adjusted by a closed loop position servo system of the type used in magnetic disk drives. Reference position information may be prerecorded on the card so that position error signals may be generated and used as feedback in motor control. Upon reading one data path, the mirror 55 is slightly rotated. The motor moves holder 42 lengthwise so that the path can be read again, and so on. As light is scattered and reflected from spots in the laser recording material, the reflectivity of the beam changes relative to surrounding material where no spots exist. The beam should deliver sufficient laser energy to the surface of the recording material to create spots of changed reflectivity in the data writing mode, but should not cause disruption of the surface so as to cause difficulty in the data reading mode. The wavelength of the laser should be compatible with the recording material to achieve this purpose. In the read mode, power is approximately 5% to 10% of the recording or writing power.

Differences in reflectivity between a spot and surrounding material are detected by light detector 65 which may be a photodiode. Light is focused onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to pits. Other optics, not shown, could be used to observe the photo images, while data is being read or written on the data strip.

A photodetector array such as a CCD could also be used. It could be either a linear array or area array. The number of detector elements per track would be approximately three elements to create a reading redundancy. The surface would be illuminated with low-cost light-emitting diodes generating power primarily in the near infra-red to match the sensitivity spectrum of the photodetector array.

I claim:

1. A method for recording medical data comprising,
   creating an eye readable medical picture on a photographic picture storage medium by exposing and developing the medium,
   disposing an optical data storage lamella in side-by-side relationship with said eye readable medical picture on said photographic picture storage medium, and
   recording an identical representation of said eye readable medical picture onto said optical data storage lamella in digital form.

2. The method of claim 1 further comprising recording medical information related to said medical picture onto said optical data storage lamella.

3. The method of claim 2 further defined wherein said medical information related to said medical picture is an anatomical description of said picture.

4. The method of claim 2 further defined wherein said medical information related to said medical picture is a medical diagnosis relating to said picture.

5. The method of claim 1 wherein said digital representation is obtained from a digital X-ray scanner, and said medical picture is an X-ray picture.

6. The method of claim 1 wherein said digital representation is obtained from a CAT scanner, and said medical picture is a CAT-scan picture.

7. The method of claim 1 wherein said digital representation is obtained from an ultrasonic scanner, and said medical picture is a ultrasonic scan picture.

8. The method of claim 1 wherein said digital representation is obtained from a NMR scanner, and said medical picture is a nuclear magnetic resonance image.

9. The method of claim 2 wherein said medical information is voice information.

10. The method of claim 2 wherein said medical information is alphanumeric.

11. A method for recording medical data comprising,
    disposing an optical data storage lamella on a medical photographic picture storage medium,
    exposing and developing an eye readable medical picture on said photographic picture storage medium, and
    recording an identical representation of said medical picture onto said optical data storage lamella in digital form.

12. The method of claim 11 further comprising recording medical information related to said medical picture onto said optical data storage lamella.

13. The method of claim 12 further defined wherein said medical information related to said medical picture is an anatomical description of said picture.

14. The method of claim 12 further defined wherein said medical information related to said medical picture is a medical diagnosis relating to said picture.

15. The method of claim 11 wherein said digital image data is obtained from a digital X-ray scanner, and said medical picture is an X-ray picture.

16. The method of claim 11 wherein said digital image data is obtained from a CAT scanner, and said medical picture is a cat-scan picture.

17. The method of claim 11 wherein said digital representation is obtained from an ultrasonic scanner, and said medical picture is an ultrasonic scan picture.

18. The method of claim 11 wherein said digital representation is obtained from a NMR scanner, and said medical picture is a nuclear magnetic resonance image.

19. The method of claim 12 wherein said medical information is voice information.

20. The method of claim 12 wherein said medical information is alphanumeric.

* * * * *